Dec. 16, 1969   M. MARKOVITZ   3,483,867
ARTIFICIAL GLOMERULUS AND A METHOD FOR TREATING BLOOD
Filed June 13, 1968   3 Sheets-Sheet 2
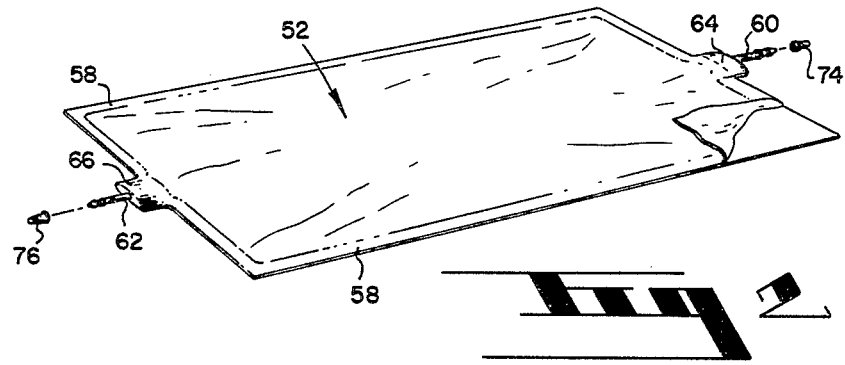
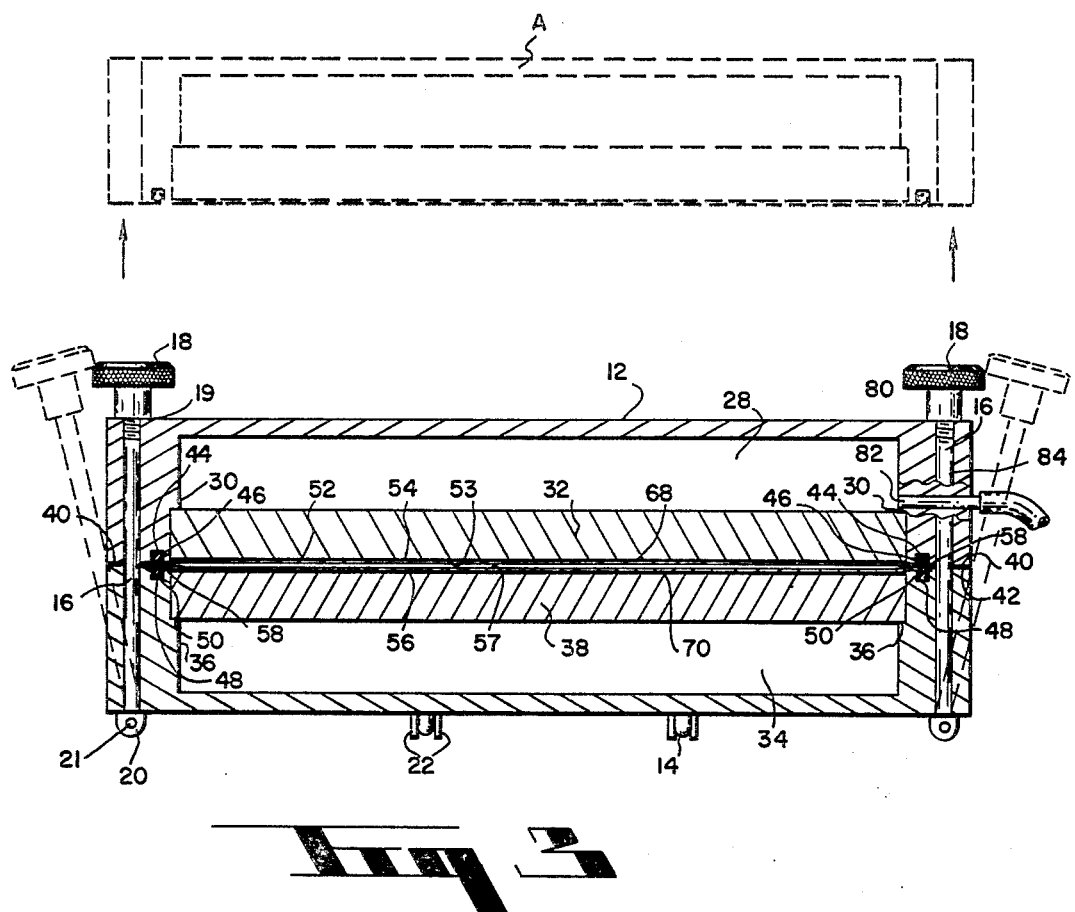
INVENTOR.
MEYER MARKOVITZ
BY
Wm. H. Dean

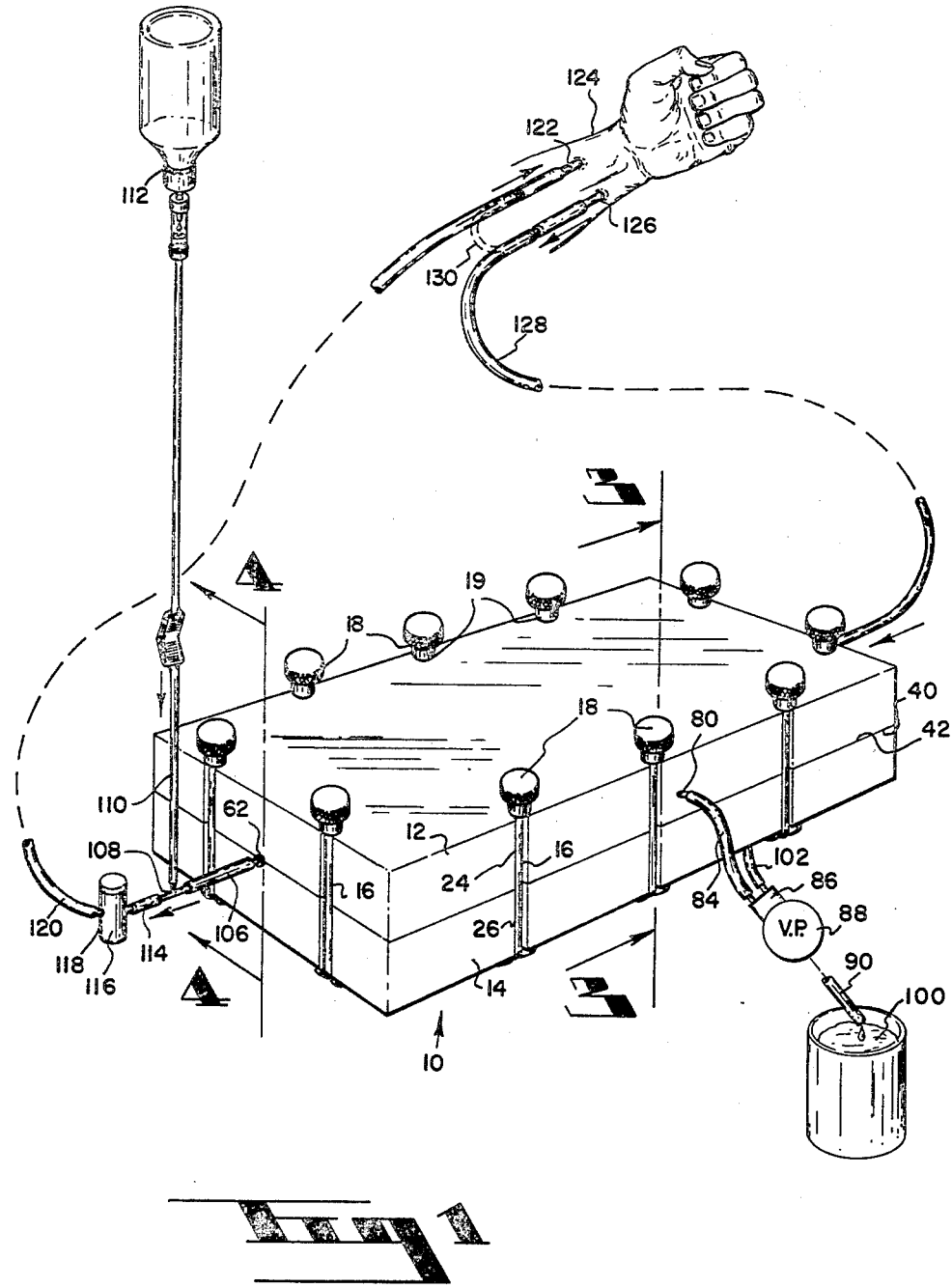

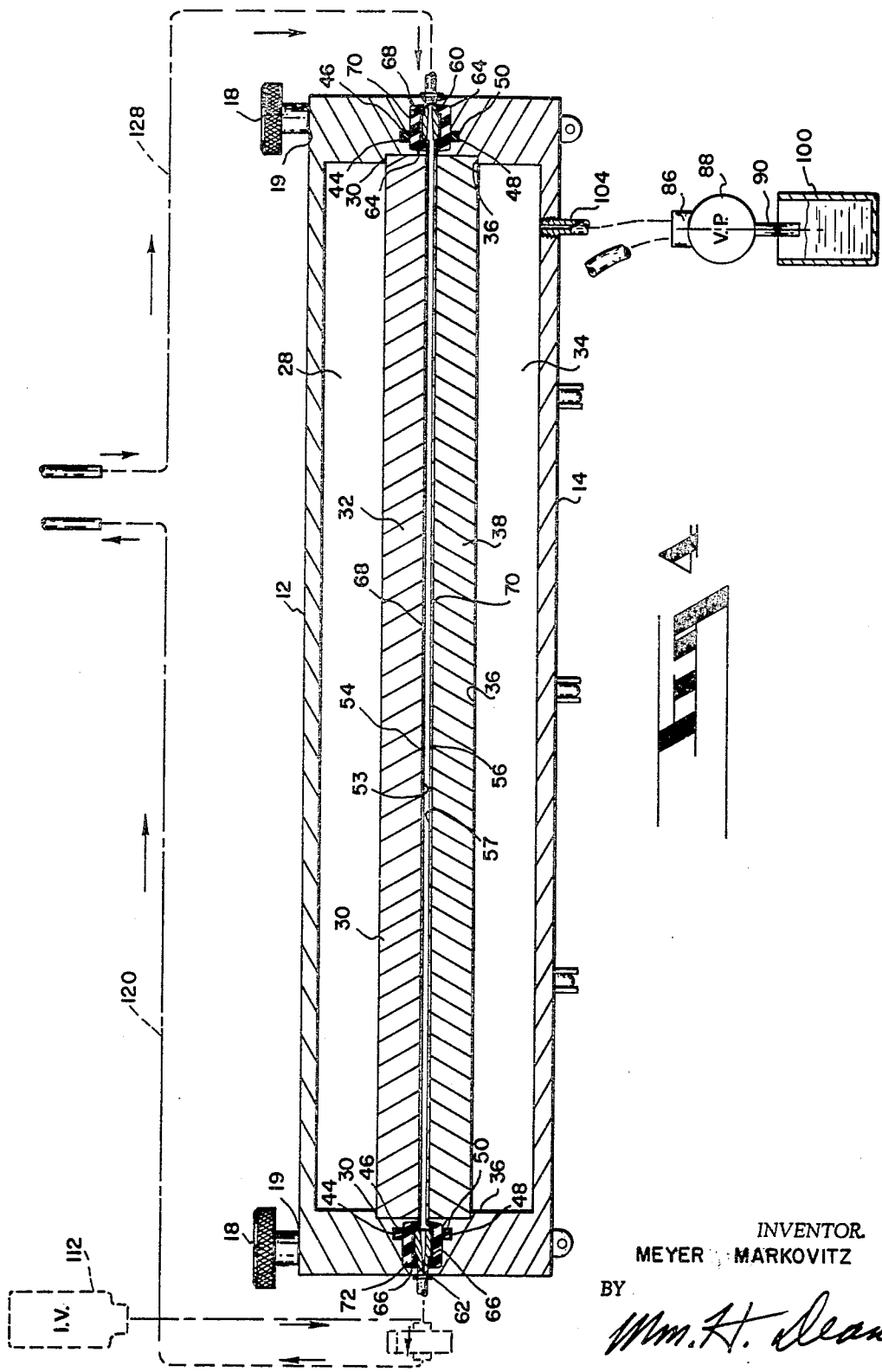

United States Patent Office 3,483,867
Patented Dec. 16, 1969

3,483,867
ARTIFICIAL GLOMERULUS AND A METHOD FOR TREATING BLOOD
Meyer Markovitz, 725 W. Lewis,
Phoenix, Ariz. 85007
Continuation-in-part of application Ser. No. 537,357, Mar. 25, 1966. This application June 13, 1968, Ser. No. 736,636
Int. Cl. A61m 1/03
U.S. Cl. 128—214    6 Claims

ABSTRACT OF THE DISCLOSURE

An artificial glomerulus and a method for treating blood, and more particularly an artificial glomerulus and method for treating blood which involves very simple and economical apparatus utilizing an uncured cellulose acetate filtering membrane which may readily be used by patients to filter blood emanating from an artery of the patient, passing through the filter and returning to a vein of the patient.

---

This application is a continuation-in-part of my parent application, Ser. No. 537,357, filed Mar. 25, 1966, now abandoned.

Heretofore, patients suffering from kidney diseases and some other disorders, have been treated by conventional dialysis apparatus and methods, all of which have been carried out in hospitals and under the supervision and attendance of trained technicians. Thus, the existing and prior art conditions of the treatment required by patients, suffering from such diseases, is very expensive and so complicated that ordinary individuals cannot utilize comparable equipment and methods at home.

Additionally, the prior art dialysis equipment is difficult to maintain due to a tendency of bacteria to grow in the dialyzing fluid and may be very hazardous to the patient during dialysis in the event small leaks occur in the membranes and allow bacteria to pass to the patient's blood.

Furthermore, the conventional dialyzing apparatus requires a large amount of blood to prime it and also requires a large amount of dialyzing fluid for its operation.

Accordingly, it is an object of the present invention to provide an artificial glomerulus and a method of treating blood which is very simple and economical and which may be used by patients at home.

Another object of the invention is to provide an artificial glomerulus and method of treating blood which does not involve any dialyzing fluid and thereby eliminates the danger of bacterial contamination of the blood, as may occur in conventional dialysis.

Another object of the invention is to provide an artificial glomerulus and method of treating blood, whereby the waste materials, including urea, creatinine, sulphates, phosphates and others, may be removed from a patient's blood by forcing these materials through a membrane and whereupon the flow of the blood back to the vein of the patient may be reconstituted by the addition of salts, sugars, vitamins, amino acids and other substances, such as calcium, phosphorous and magnesium, so as to replace such elements to the blood after these have been drawn from the blood along with the waste materials.

Another object of the invention is to provide a very simple, small artificial glomerulus which does not require substantial priming as does conventional dialyzing apparatus.

Another object of the invention is to provide a very simple artificial glomerulus having a blood receiving chamber provided with a membrane on one side and a vacuum chamber tending to draw urea and other waste materials through the membrane; the blood receiving chamber having an inlet adapted to be connected to an artery of a patient and an outlet adapted to be connected to a vein of a patient and an intravenous feed communicating with the outlet of the blood receiving chamber and with the vein of the patient, whereby waste materials, as well as some desirable materials, are removed from the blood through the membrane and whereby the intravenous feed replaces the desirable materials into the blood before it returns to the vein of the patient, all of which provides a very simple means and method for treating a patient's blood.

Other objects and advantages of the invention will be apparent from the following specification, appended claims and accompanying drawings, in which:

FIG. 1 is a perspective view of an artificial glomerulus in accordance with the present invention, shown in connection a conventional cannulas on a patient's arm;

FIG. 2 is a perspective view of a disposable blood chamber envelope in accordance with the present invention;

FIG. 3 is a cross-sectional view of the housing structure of the invention containing a blood receiving chamber and vacuum chambers and illustrating by broken lines, varying positions of parts thereof; and FIG. 4 is a sectional view taken from the line 4—4 of FIG. 1, showing diagrammatically the disposition of parts of the apparatus and indicating the position of the intravenous feed of the apparatus by broken lines.

In accordance with the present invention, the glomerulus function of the human kidney is imitated by removing from the blood, not only waste materials, but some water and water soluble materials. In this manner, not only waste materials are removed from the blood, but some of the desirable constituents, including water and other soluble substances, such as sodium bicarbonate, sodium chloride, glucose, free amino acids and some vitamins. Thus, the artificial glomerulus of the present invention differs from the dialysis method, since this conventional method provides for an exchange between blood and a dialyzing fluid on opposite sides of a membrane. In the dialyzing method, the fluids, namely, the blood and the dialyzing fluid tend to reach an equilibrium and cause an exchange of the waste materials only from the blood to the dialyzing fluid.

By contrast, the present invention removes the waste materials and some desirable materials and simply replaces the desirable materials through a conventional device, such as an intravenous feed, this feed being coupled with the apparatus to replace the desirable materials into the blood, as it proceeds from the blood receiving chamber of the apparatus and into the vein of the patient. In this manner, the blood is reconstituted to replace the desirable materials to the blood which have previously been removed from the blood along with the waste materials.

As shown in FIG. 1 of the drawings, an artificial glomerulus of the present invention comprises an apparatus, including a housing 10 composed of a pair of housing parts 12 and 14 clamped together by clamp bolts 16 having manually operable screw threaded clamp nuts 18 screw threaded thereon and having shoulders 19 adapted to bear on the outsides of the housing 12. The bolts 16 are provided with eye portions 20 having pins 21 extending therethrough, which pins 21 also extend through spaced boss portions 22 of the housing 14, such that the bolts 16 remain in pivotal connected relation with the housing 14 when the housing 12 is removed therefrom, as indicated by broken lines A in FIG. 3 of the drawings.

The side walls of the housings 12 and 14 are provided with slots 24 and 26, respectively, through which the bolts 16 extend so as to permit the shoulders 19 of the thumb screw nuts 18 to bear directly on the aforesaid surface of the housing portion 12.

The housing 12 is provided with a vacuum cavity or chamber 28, wherein a shoulder 30 supports a sintered stainless steel plate 32. It will be understood that this plate 32 may be otherwise constructed to form a suitable foraminous structural member which is pervious to water soluble materials.

The housing member 14 is provided with a vacuum chamber 34, wherein a ledge or shoulder 36 supports a second sintered stainless steel plate 38 which is similar to the plate 32, hereinbefore described.

The housing 12 is provided with an edge structure 40 surrounding its cavity 28 and the housing 14 is provided with an edge structure 42 surrounding its cavity 34. An O-ring groove is disposed in the edge structure 40, this groove being designated 44 and having therein an O-ring 46 which continuously surrounds the cavity 28. Likewise, the edge structure 42 is provided with a groove 48 in which an O-ring 50 is disposed, which completely surrounds the cavity 34. The O-rings 46 and 50 are directly opposed to each other, when the housing structures 12 and 14 are clamped together by the clamp bolts 16, as shown in FIG. 3. The O-ring 46 is then disposed to bear sealingly against peripheral portions of a disposable membrane envelope, as shown in FIG. 2, while the O-ring 50 is disposed to surround and sealingly bear against an opposite side of the same peripheral portion of this membrane envelope, as shown in FIG. 2.

Accordingly, attention is directed to FIG. 2, wherein the blood receiving membrane envelope, designated 52, is provided with a pair of spaced walls 54 and 56 which are hermetically sealed around the peripheral or marginal portions 58 to provide a blood receiving chamber between the membrane layers 54 and 56. The envelope is provided with an inlet conduit 60 and outlet conduit 62 which are connected to respective boss portions 64 and 66 integral with the sheet structures or membrane structures 54 and 56 of the envelope 52.

As shown in FIG. 3, ledges 30 and 36 and the wall thicknesses of the permeable or foraminous sintered plates 32 and 38 are so dimensioned that surfaces 68 and 70, respectively, of the plates 32 and 38 provide supports for the membrane walls 46 and 58 of the envelope 52, and, thus, these walls are held apart an optimum distance so as to retain a minimum amount of blood in the blood receiving chamber of the enevelope and yet afford sufficient flow cross-sectional area to prevent an undue resistance to the flow of the blood through the chamber between the membranes 54 and 56 from the inlet 60 to the outlet 62, as will be hereinafter described in detail.

The bosses 64 and 66 are retained in conventional compression fittings 70 and 72 engaged on opposite sides by the O-rings 46 and 50, hereinbefore described. These O-rings 46 and 50, at their engaged portions with the compression fittings 70 and 72, are offset from the planes of the edge structures 40 and 42 and likewise, the O-ring grooves 44 and 48 are also offset to surround these compression fittings.

The envelope 52 is produced and hermetically sealed in sterile condition and the inlet and outlet tubes 60 and 62 are hermetically sealed in sterile condition by means of conventional plastic seal caps 74 and 76, as shown in FIG. 2 of the drawings. Thus, the disposable envelope 52 may be thrown away after each blood treating operation, as will be hereinafter described, and a new one may be placed between the housing portions 12 and 14 in the position as shown in FIGS. 3 and 4, whereupon a tubular conduit means extending from a patient's artery may be connected to the inlet 60 and a conduit means extending from the patient's vein may be connected to the outlet 62.

Many conventional membranes are suitable for the construction of the envelope 52 and the structure of these membranes 54 and 56 of the envelope 52 must operate as though they contained passages which are disposed to prevent substantial passage of blood proteins through the membrane, but which functional passages are disposed readily to permit the passage of water and urea, together with other waste materials through the membrane.

While there are several membrane materials available for the purpose of constructing the envelope 52, it is contemplated that a desirable material will permit optimum flow with respect to cross-sectional area, of water and waste materials through the membrane without permitting substantial passage of blood proteins, or the like. Accordingly, it is desired to utilize a membrane which will permit the passage therethrough of water which has a molecular weight of 18, urea with a molecular weight of 60, and glucose, a molecular weight of 180, and any molecules with a molecular weight up to 69,500, which is the molecular weight of human serum albumen. Further, the membrane material of the envelope 52 must be of such character that the passages are not subject to plugging and theoretically, the function of such a membrane, according to the present invention, differs from conventional dialysis, in that the driving force for the separation of the water and waste materials from the protein elements of the blood is provided by hydraulic pressure, or a pressure differential, rather than by a concentration gradient between the materials on the opposite sides of a conventional dialysis-type membrane. According to some theories, the plugging effect is avoided simply by reason of the fact that the solvent molecules of the waste materials and the solutes moves through the membrane by molecular diffusion, while the solutes to which the membrane is impervious never really enter the membrane substance, and, consequently, in the present instance, the blood proteins, according to this theory, cannot plug the passages of the membrane structure.

Specific reference is made to a publication of the University of California, Los Angeles, No. 65–13, report of March 1965, entitled, "Semipermeable Desalination Membranes from Organic Casting Solutions," by S. Manjikian. Specific reference is made to pages 13 and 14, and it is to be understood that applicant's use of such membranes requires that the membrane is not cured as contrasted with curing of film, as set forth in page 14 of this report. Applicant uses the film or membrane in non-cured condition in order to avoid shrinkage of the pore structure so that all materials, including salts may pass through the membrane while the membrane retains the blood protein and prevents them from passing therethrough.

Specifically, the membrane material, in accordance with the present invention, may be produced by employing a casting solution which is a mixture of cellulose acetate: formamide:acetone in the proportions 25:30:45 percent by weight. The cellulose acetate utilized is Eastman Chemical Company material No. E-398-10. Casting is accomplished at room temperature. A flat membrane may be cast between two flat plates spaced apart 0.045 cm. with the plate surfaces disposed substantially vertically so that the material may be poured between the plates and may pass downward through the plates by gravity.

One plate may be moved vertically relative to the other to drag the casting solution into position between the plates in a downward direction.

Each square centimeter of the nascent sheet is held by immersion in ice water after descending 30 cm. through the air between the bottom of the casting plates and disturbance of the ice water in the immersion tank.

After immersion, the membrane and casting plates are kept in the immersion ice water for about one hour after which the membrane shrinks away from the casting plates.

Shrinkage of the membrane is due to leeching of the formamide and acetone by the ice water and the most prominent effect of such leeching is to decrease the membrane thickness to about 0.020 cm. from the original thickness between the casting plates of 0.045 cm.

Accordingly, a sheet of membrane material is produced and ready for use in accordance with the structural disclosure of the present invention.

Reference is made to a report No. 66–40, June, 1966, by S. Loeb of the University of California. The report compiled a composite tubular assembly for reverse osmisis desalination, e.g., Water Resources Center Desalination Report No. 5. In this report, the method of making tubular membranes is disclosed on pages 2, 3, 4 and 5, and on page 7 eight treatments of the membrane is described, however, this heat treatment tends to reduce the size of the pores of the membrane which is an undesirable step as far as applicant's invention is concerned. The membrane produced according to the above referenced report has been used for removing salt from water. However, the membrane produced in accordance with applicant's invention and according to said report, does not include the heat treatment of the membrane so that the pores of the membrane without heat treatment are capable of passing water soluble salts as contrasting with the final condition of the membrane as described on page 7 of said report which is adapted for use in removing salt from sea water. The object of the heat treatment of the membrane is to reduce the pores so as to remove the salt from sea water, and accordingly, very high pressure is needed, especially when it is desired to obtain a large amount of fresh water by removing the salt. The high pressure is needed to overcome the osmotic pressure differential between the sea water and fresh water. Accordingly, it will be appreciated by those skilled in the art, that the membrane produced without heat treatment comprises larger pores which allows the water soluble salts, including urea, to pass through the membrane and does not require a great pressure differential since the osmotic pressure differential is not comparable to that needed for making pure water from sea water. In applicant's device, only the blood proteins are prevented from passing through the membranes, and consequently, the water and salts that do pass through the membrane pass through quite readily with a very or substantially lower pressure differential.

In accordance with applicant's invention, the blood pressure relative to human beings may approach 120 mm. of mercury. This small pressure differential allows blood pressure alone to force a substantial amount of the waste materials in the bood through the membrane and permits retention of the protein as desired. Kidney patients, through their kidneys have not failed completely, need only a small amount of assistance in order to maintain reasonably good health and to prevent undue loading of the partially kidneys.

As shown in FIGS. 1, 3 and 4 of the drawings, a vacuum conduit 80 extends through the wall of the chamber or cavity 28 and communicates with the inside thereof at an open end 82 of the conduit. A tubular conductor 84 is connected to the conduit 80 and to the inlet 86 of a vacuum pump 88. The outlet of the pump 88 delivers fluid through an outlet conduit 90 and into a container 100. Also, coupled to the inlet 86 of the vacuum pump is another tube 102 which communicates through a conduit 104 with the interior of the chamber 34. Thus, the inlet 86 of the vacuum pump 88 communicates directly with the vacuum chambers or waste fluid receiver chambers 28 and 34, creating a vacuum which communicates through the permeable sintered stainless plates and with opposite sides of the membranes 54 and 56 from the inner sides thereof, which form wall surfaces for the blood receiving chamber, the inner sides of the membranes 54 and 56 being designated 53 and 57, respectively, and constituting wall surfaces of the blood receiving chamber, in accordance with the present invention.

The vacuum pump 88 may be of any suitable type, but is designed to operate at slightly less than one atmosphere of vacuum, as for example, this pump may impose 12 to 13 pounds per square inch of negative pressure in the chambers 28 and 34 to thereby act vacuummatically on the membranes 54 and 56 to draw water and other materials therethrough from blood in the chamber between the membranes 54 and 56, as will be hereinafter described.

As shown in FIG. 1 of the drawings, a tubular conduit element 106 is coupled to the outlet 62 of the envelope 52 and connected to the tubular conduit 106 is a T108 connected to a tubular outlet conduit 110 of an intravenous feed device 112 of conventional configuration.

Coupled with the T108 is a conduit portion 114 connected to deliver blood from the outlet 62 into a gas and clot receiver 116, which is adapted to relieve the blood of clots and gaseous elements, this receiver 116 being conventional device and its outlet 118 being coupled to a conduit 120 which delivers blood to a vein connected to a cannula 122 in a patient's arm, designated 124. An arterial cannula 126 is connected to a tube 128 which delivers arterial blood to the inlet 60, as indicated in FIG. 1, and diagrammatically in FIG. 4.

In operation of the artificial glomerulus and method of treating blood, in accordance with the present invention, the patient being treated normally has a horseshoe 130 installed on the cannulas 122 and 126, as shown in FIG. 1, and in the conventional manner, the horseshoe 130 is disconnected and the tubes 120 and 128 are connected, as shown and hereinbefore described in connection with FIG. 1 of the drawings.

Since the space between the envelope walls or membrane elements 54 and 56 is small, the blood receiving chamber between the wall surfaces 53 and 57 does not need to be primed with blood. The blood under human blood pressure, passes through the chamber between the walls 53 and 57, and vacuum in the chambers 28 and 34, as hereinbefore described, increases the pressure differential across the membrane walls and draws water, waste materials and some desirable elements from the blood through the structural supporting walls 32 and 38, which are as hereinbefore described, preferably stainless steel sintered material. The material subjected to a pressure differential across the membrane created by blood pressure and/or vacuum are forced through the membranes 54 and 56 and into the conduits 80 and 104 into the vacuum pump and these materials are deposited in the waste container 100.

As the blood flows on through the chamber between the wall surfaces 53 and 57 at human blood pressure, it passes from the outlet 62 and is supplied make up fluid to reconstitute the blood, this fluid comprising such materials as water, including salt, sugar, vitamins, amino acids and other substances, such as calcium, phosphorous and magnesium, as may be conveniently dispensed in intravenous feed devices. This reconstituting material is fed through the intravenous feed device 112 and conduit 110 into the T108 and delivered into the tubular conduit 114 at the inlet of the clot and gas receiver which clears the blood of gas and clots, whereupon the blood is delivered through the tube 120 to the cannula 122 and into the vein of the patient.

It will be appreciated by those skilled in the art that the bulk of the apparatus of the present invention greatly distinguishes from that of the conventional dialysis method, particularly in view of the fact that the blood receiving chamber means of the invention is relatively small and restoration fluid dispensed from the intravenous feed device 112 may amount to about only two liters of fluid, while a dialysis machine for use with a comparable patient might require the use of at least 100 liters of dialyzing fluid and a comparably sized apparatus.

Additionally, it will be obvious to those skilled in the art that in the absence of the use of any dialyzing fluid, applicant's invention provides for the avoidance of the dangers of bacteria entering the blood stream through the membranes. In the apparatus of the invention, flow of materials is away from the blood rather than placing the blood in an exchange relationship with another fluid. Furthermore, the passage capability of the membranes 54 and 56 may be such, that the waste materials may be quickly removed from the blood through relatively small areas afforded by the membranes 54 and 56. These, of course, must be sized in accordance with their passage capabilities in order to provide for optimum performance in relation to time and the removal of certain materials from the blood, which may readily be restored through the intravenous feed 112.

It will further be obvious to those skilled in the art that the simple and small apparatus of the invention imitating a glomerulus function, may be economically constructed and readily operated by a patient in a home use environment.

I claim:

1. In an artificial glomerulus, the combination of: means forming a blood receiving chamber; a blood inlet means for said chamber; a blood outlet means for said chamber; first conduit means for coupling a human artery to said inlet means for delivering blood from said artery to said chamber; second conduit means for coupling a human vein to said outlet means to receive blood from said chamber and to deliver it to said vein; a membrane composed of uncured cellulose acetate material which forms a wall surface of said blood receiving chamber; said membrane having passages therethrough, said passages disposed to prevent substantial passage of blood proteins through said membrane, but said passages disposed readily to permit the passage of water and urea through said membrane; a substantially rigid foraminous support for said membrane at an opposite side of said membrane from said blood receiving chamber; a vacuum chamber communicating with said opposite side of said membrane; means disposed to create a vacuum in said chamber for drawing water soluble materials, including waste, from said blood receiving chamber and through said membrane into said vacuum chamber; an intravenous feed means communicating with the interior of said outlet and disposed to feed water soluble materials into said vein to replace desirable materials to said blood, which are removed with said water soluble waste materials.

2. The invention, as defined in claim 1, wherein: a gas and clot receiving chamber means is interposed in said second conduit means between said outlet and said vein and disposed to separate gas and clots from blood being conducted from said outlet to said vein.

3. In an artificial glomerulus, the combination of: disposable envelope composed of a pair of spaced membrane walls having peripheral portions hermetically sealed together; said membrane walls composed of uncured cellulose acetate material; means forming a blood receiving chamber between said walls; a blood inlet means for said envelope; a blood outlet means for said envelope; first conduit means for coupling a human artery to said inlet means for delivering blood from said artery into said chamber; second conduit means for coupling a human vein to said outlet means to receive blood from said chamber and to delivery it to said vein; said walls having passages therethrough, said passages disposed to prevent substantial passage of blood proteins through side walls of said envelope, but said passages disposed readily to permit the passage of water and urea therethrough; a substantially rigid foraminous support for each of said walls; a vacuum chamber means communicating with each of said supports and membrane walls; means disposed to create a vacuum in each of said chambers for drawing water soluble materials, including waste, from said blood receiving chamber and through said walls into said vacuum chamber; an intravenous feed means communicating with the interior of said outlet and disposed to feed water soluble materials into said vein to replace desirable materials to said blood, which are removed with said water soluble waste materials; said means forming a blood receiving chamber comprises a pair of housing members; gasket means between said housing members and bearing against peripheral portions of said envelope.

4. The invention, as defined in claim 3, wherein: means is provided to clamp said housing members together at opposite sides of said envelope for holding the peripheral portions in sealed relation to said vacuum chambers.

5. A method for continuously obtaining blood directly from an artery of a human patient through artificial glomerular filtration of human blood consisting in: continuously passing said blood adjacent to a pervious membrane of uncured cellulose acetate material and causing a pressure differential across said membrane, such that the water soluble materials of the blood which carry urea, pass through the membrane and such that blood proteins are prevented from passing through the membrane; and then reconstituting the blood to replace water and water soluble materials carried away with the water and urea which passes through the membrane; and then continuously feeding the reconstituted blood into the vein of a patient.

6. In an artificial glomerulus, the combination of: means forming a blood receiving chamber; a blood inlet means for said chamber; a blood outlet means for said chamber; first conduit means for coupling a human artery to said inlet means for delivering blood from said artery to said chamber; second conduit means for coupling a human vein to said outlet means to receive blood from said chamber and to deliver it to said vein; a membrane of uncured cellulose acetate material forming a wall surface of said blood receiving chamber; said membrane having passages therethrough, said passages disposed to prevent substantial passage of blood proteins through said membrane, but said passages disposed readily to permit the passage of water and urea through said membrane; a substantialy rigid foraminous support for said membrane at an opposite side of said membrane from said blood receiving chamber; a fluid receiving chamber communicating with said opposite side of said membrane; means disposed to create a pressure differential across said membrane for forcing water soluble waste materials from said blood receiving chamber and through said membrane into said fluid receiving chamber; an intravenous feed means communicating with the interior of said outlet and disposed to feed water soluble materials into said vein to replace water and desirable materials to said blood, which are removed with said water soluble waste materials.

References Cited

Malinow et al., An Experimental Method for Obtaining an Ultrafiltrate of the Blood, from The Journal of Laboratory and Clinical Medicine, vol. 32, January–December 1947, pp. 461–471 relied on.

REUBEN FRIEDMAN, Primary Examiner

F. A. SPEAR, JR., Assistant Examiner

U.S. Cl. X.R.

210—23, 321